United States Patent Office 3,432,736
Patented Mar. 11, 1969

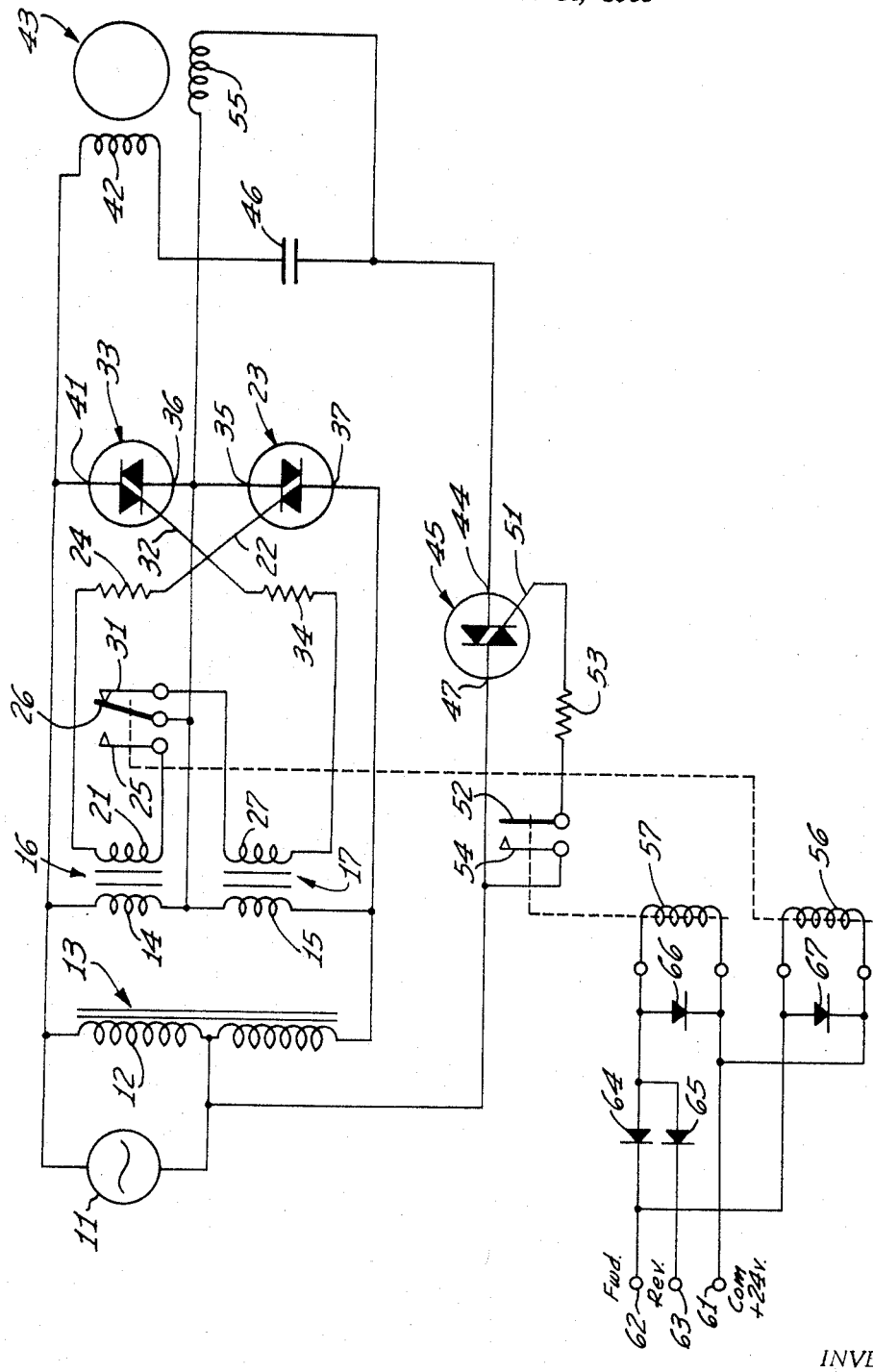

3,432,736
AC MOTOR PHASE REVERSING CIRCUIT
Bernard M. Van Emden, Van Nuys, Calif., assignor to Advance Data Systems, Beverly Hills, Calif., a corporation of New York
Filed Dec. 16, 1965, Ser. No. 514,238
U.S. Cl. 318—202          6 Claims
Int. Cl. H02p 1/40

ABSTRACT OF THE DISCLOSURE

Rotation direction control circuit for use with a two phase AC motor. An AC source is connected across one half an autotransformer, each of the two ends of the autotransformer winding being connected to a separate Triac. The other terminals of the Triacs are both connected to one phase of the motor field winding. One or the other Triac is energized to connect one of the ends of the autotransformer to the field winding, each end being in 180 degree phase opposition. The Triac energized is selected by a double throw relay contact connecting the selected Triac gate electrode to one of two transformer secondary windings, the primaries being connected in series across the autotransformer.

---

This invention relates to a phase reversing circuit and more particularly to a phase reversing circuit for controlling the direction of rotation of an induction motor. The present invention contemplates means for energizing a two-phase induction motor and for controlling the direction of rotation thereof. The circuit derives both the reference phase and the quadrature phase currents applied to the field windings from a conventional single-phase AC line. The quadrature phase may be rotated 180 degrees to control the direction of rotation of the motor.

The currents applied to the motor windings are controlled by a gate-controlled, bi-directional, triode AC semi-conductor switch. The switches controlling application of power to the motor and the direction of rotation thereof carry only the low currents applied to the gate electrodes of the triode semiconductor switches.

It is, therefore, an object of this invention to provide an alternating current motor control circuit.

Another object of this invention is to remotely control the operation of an alternating current motor.

Another object of this invention is to provide a solid state electronic phase reversing circuit.

Another object of this invention is to provide a phase reversing circuit employing gate-controlled, bi-directional, semi-conductor triode switches controlled by low current relay contacts.

Another object of this invention is to provide a simple, reliable, inexpensive phase reversing motor control circuit.

These and other objects and advantages of the present invention will become apparent from the following specification and accompanying drawing, wherein the sole figure is a schematic diagram of the present invention.

The present invention employs bi-directional, triode AC semi-conductor switches which are triggered into conduction by a gate signal of either polarity and conducts in both directions of current flow in response to the gate signal, acting as a closed switch. Current continues to flow until the gate signal goes to zero. Such a gate-controlled AC semi-conductor switch is known as a Triac. The construction and characteristics of the Triac are disclosed in Application Note 200.35, dated May 1964, and issued by General Electric Company, Rectifier Components Department, Auburn, N.Y.

In the motor control circuit of the present invention, an alternating current source 11 is connected across the primary portion 12 of the winding of auto-transformer 13. The primary windings 14 and 15 of transformers 16 and 17, respectively, are connected in series across the terminals of the entire winding of auto-transformer 13. Secondary winding 21 of transformer 16 has one terminal connected to the gate terminal 22 of Triac 23 through a series resistor 24. The other terminal of secondary winding 21 of transformer 16 is connected to normally open relay contact 25. Transfer contact 26 of the relay is connected to the junction of primary windings 14 and 15 of transformers 16 and 17, respectively. Secondary winding 27 of transformer 17 has one end connected to normally closed relay contact 31, and through transfer contact 26 to the junction between primary windings 14 and 15 of transformers 16 and 17, respectively. The other end of secondary winding 27 of transformer 17 is connected to gate terminal 32 of Triac 33 through a series resistor 34. Terminals 35 and 36 of Triacs 23 and 33, respectively, are connected to the junction of primary windings 14 and 15 of transformers 16 and 17, respectively. Terminal 37 of Triac 23 is connected across the entire winding of auto-transformer 13. In a similar manner terminal 41 of Triac 33 is connected to the other terminal of auto-transformer 13 and, therefore, directly to one terminal of alternating current source 11.

A first field winding 42 of a two-phase alternating current induction motor 33 has one terminal connected to AC source 11. The other terminal of the field winding 42 is connected to terminal 44 of Triac 45 through a phase-splitting capacitor 46. Terminal 47 of Triac 45 is connected to AC source 11. Gate terminal 51 of Triac 45 is connected to normally open transfer relay contact 52 through resistor 53. Relay contact 54 is connected to a terminal of AC source 11. The second field winding 55 of AC motor 43 has one terminal connected to the junction of primary windings 14 and 15 of transformers 16 and 17 while the other terminal of field winding 55 is connected to terminal 44 of Triac 45.

Transfer contact 26 is actuated by relay coil 56 and transfer contact 52 is actuated by relay coil 57. One end of relay coil 56 is connected to a suitable source of direct voltage through terminal 61. The other terminal of relay coil 56 is connected to the forward, or clockwise, direction of rotation terminal 62. Relay coil 57 is also connected to forward direction of rotation terminal 62, and to the reverse, or counterclockwise, direction of rotation of terminal 63 through diodes 64 and 65, respectively. A transient suppressing diode 66 is connected in parallel with relay coil 57 and transient suppressing diode 67 is connected in parallel with relay coil 56. Diodes 66 and 67 are connected in circuit with a polarity providing a high impedance across the relay coils. If a high voltage surge occurs across the coils, diodes 66 and 67 break down, acting in the Zener mode.

Operation of motor 43 in either the clockwise or counterclockwise direction of rotation is initiated by completing a circuit between either terminal 62 for the clockwise direction or terminal 63 for the counterclockwise direction of rotation, to the DC source having its positive terminal connected to 61. If the clockwise, or forward, terminal 62 is actuated, both of relay coils 56 and 57 will be energized. Energization of relay coil 57 closes the circuit between AC source 11 and gate terminal 51 of Triac 45 through contacts 54 and 52 and resistor 53. Triac 45 functioning as a switch, closes the circuit between AC source 11, a terminal of field winding 55 of motor 43, and through phase-splitting capacitor 46, to a terminal of the other field winding 42 of motor 43. The other terminal of field winding 42 is directly connected to alternating current source 11.

Actuation of relay coil 56 closes the circuit between relay contacts 25 and 26. This establishes a circuit for secondary winding 21 of transformer 16 to the junction point of primary windings 14 and 15 of transformers 16 and 17, respectively. The other end of secondary winding 21 of transformer 16 is connected to gate terminal 22 of Triac 23. Thus, closing relay contacts 25 and 26 actuates Triac 23, closing the circuit between the lower end of the winding of auto-transformer 13 and field winding 55 of motor 43.

To reverse the direction of rotation of motor 43 the phase of the current applied to field winding 55 must be rotated 180 degrees. To accomplish this, the reverse, or counterclockwise, terminal 63 is energized, actuating relay coil 57. Contacts 54 and 52 close, triggering Triac 45 and applying the 90 degree out of phase component to field winding 42 of motor 43. However, relay 56 is not actuated, allowing the circuit including transfer contact 26 and contact 31 to remain closed, connecting secondary winding 27 of transformer 17 to the junction of the primary windings 14 and 15 of transformers 16 and 17 and energizing gate terminal 32 of Triac 33 through resistor 34. Energization of Triac 33 closes a circuit from the upper terminal of auto-transformer 13 to field winding 55 of motor 43.

Thus, auto-transformer 13 provides two voltages, one at each extreme of the winding, which are 180 degrees out of phase with one another. One of these voltages is connected by Triac 23 or Triac 33 to field winding 55 of motor 43. The end of auto-transformer 13 selected depends upon the energization of relay coil 56, moving transfer contact 26 from fixed contact 31 to fixed contact 25.

If both Triacs were to be turned on simultaneously, a direct short circuit would be placed across the auto-transformer. Both Triacs would be overloaded and destroyed. This eventuality is prevented by the circuit including transformers 16 and 17, and resistors 24 and 34. As will be apparent, when Triac 33 is turned on, the primary winding 14 of transformer 16 is short circuited by the low impedance Triac switch 33. Thus gate voltage cannot be applied to gate terminal 22 of Triac 23 by transformer 16. Similarly, if Triac 23 is conducting, a short circuit is placed across primary winding 15 of transformer 17. Thus, no voltage can be induced in secondary winding 27 and Triac 33 cannot be energized. The serially connected primary windings 14 and 15 of transformers 16 and 17 have high impedances and have substantially no effect on the circuit other than to provide the small triggering current to Triacs 23 and 33.

The Triacs serve as low-noise power switches. The triggering current through the relay contacts is negligible, thereby keeping sparking at the contacts and the subsequent generation of radio noise down to a negligible amount. Resistors 24, 34 and 53 connected to the gate terminals of Triacs 33, 23 and 45, respectively, serve to limit the current surge upon opening and closing of the contacts associated with these gate terminals, further assisting in reduction of noise to a negligible amount, and assuring a long, reliable operational life for the relay contacts, although motor 43 may require high currents.

The embodiment of this invention disclosed hereinabove is intended to be exemplary only, and the true scope and spirit of this invention is to be defined by the appended claims.

What I claim is:

1. A phase reversing circuit adapted to control the direction of rotation of an alternating current motor having first and second field windings comprising:
    a single phase AC source;
    means connected to said single phase AC source for deriving first and second alternating currents in phase opposition;
    switching means selectively connecting one of said first or second alternating currents to said first field winding, said switching means including: a first triode AC semiconductor switch having first and second terminals and a gate terminal; a second triode AC semiconductor switch having first and second terminals and a gate terminal; means interconnecting said second terminal of said first semiconductor switch, said first terminal of said second semiconductor switch, and said first field winding; means for applying said first alternating current to said first terminal of said first semiconductor switch, and for applying said second alternating current to said second terminal of said second semiconductor switch; and a trigger circuit connected to said gate terminals of said first and second semiconductor switches selectively applying a trigger current to one of said gate terminals;
    phase shifting means connected to said AC source for providing an alternating current in phase quadrature; and
    means connecting said phase shifting means to said second field winding.

2. In the phase reversing circuit of claim 1, said trigger circuit including:
    a first transformer having a primary winding and a secondary winding;
    a second transformer having a primary winding connected in series with said primary winding of said first transformer, and a secondary winding;
    means for applying said first current to the primary winding of said first transformer;
    means for applying said second current to the primary winding of said second transformer;
    a switch for selectively connecting the secondary winding of said first transformer and the secondary winding of said second transformer to the junction of said primary winding of said first transformer and said primary winding of said second transformer; and
    conductor connecting said gate terminal of said first semiconductor switch with said secondary winding of said second transformer and said gate terminal of said second semiconductor switch with said secondary winding of said first transformer.

3. In the phase reversing circuit of claim 2:
    said phase shifting means comprising a phase-splitting capacitor connected in series with said second field winding.

4. In the phase reversing circuit of claim 3:
    means for connecting said phase-splitting capacitor and a terminal of said first field winding to said AC source including:
    a selectively closable semiconductor switch having a first terminal connected to said AC source;
    a second terminal connected to said phase-splitting capacitor and said first field winding terminal;
    a gate terminal; and
    means for applying a trigger current to said gate terminal.

5. In the phase reversing circuit of claim 4, said means for deriving first and second currents in phase opposition comprising:
    an autotransformer having a winding between first and second terminals;
    a third terminal connected to said winding between said first and second terminals; and
    means connecting said first and third terminals to said AC source.

6. In the phase reversing circuit of claim 5, a control circuit including:
    a first relay having a first contact connected to said secondary winding of said first transformer, a second contact connected to said secondary winding of said second transformer, and a transfer contact connected to said first field winding;
    a second relay having normally open contacts connected to said gate terminal of said third semiconductor switch and said AC source; and
    means for selectively energizing said first relay and said second relay whereby energizing said first relay causes said motor to rotate in a first direction and energizing said first and second relays causes said motor to rotate in a second direction.

References Cited

UNITED STATES PATENTS

| | | | |
|---|---|---|---|
| 2,821,674 | 1/1958 | Hughes | 318—207 XR |
| 3,171,073 | 2/1965 | Adams | 318—207 |
| 3,181,046 | 4/1965 | Sutton | 318—207 XR |
| 2,740,932 | 4/1956 | King | 318—202 |

ORIS L. RADER, *Primary Examiner.*

GENE RUBINSON, *Assistant Examiner.*

U.S. Cl. X.R.

318—207, 293